United States Patent [19]

Mochizuki et al.

[11] Patent Number: 4,644,155
[45] Date of Patent: Feb. 17, 1987

[54] READING OPTICAL SYSTEM

[75] Inventors: Noritaka Mochizuki, Yokohama; Chikara Jin, Tokyo; Toshie Kaneko, Yokohama, all of Japan

[73] Assignee: Canon Kabushiki Kaisha, Tokyo, Japan

[21] Appl. No.: 593,489

[22] Filed: Mar. 26, 1984

[30] Foreign Application Priority Data

Mar. 30, 1983 [JP] Japan .................................. 58-54874

[51] Int. Cl.$^4$ ................................................ H01J 5/16
[52] U.S. Cl. ..................................... 250/227; 235/473
[58] Field of Search ................ 235/473; 250/234, 235, 250/227; 358/285

[56] References Cited

U.S. PATENT DOCUMENTS 1,886,189 10/1932 Hough .................................. 250/235
4,052,594 10/1977 Davis .................................... 235/473
4,232,219 10/1980 Yamamoto ............................ 235/473

Primary Examiner—David C. Nelms
Assistant Examiner—L. W. Madoo
Attorney, Agent, or Firm—Fitzpatrick, Cella, Harper & Scinto

[57] ABSTRACT

A reading optical system comprises a transparent block a part of whose bottom surface is an inclined surface forming an angle with respect to the horizontal plane, combined light-guides embedded in the block and having one end thereof all disposed on the intermediate portion of the inclined surface spaced apart by a predetermined distance from the lower end of the inclined surface and the other end extending on the upper surface of the block, a light sensor installed on the upper surface of the block in opposed relationship with the other end of the combined light-guides, and an illuminating system for illuminating the vicinity of the surface of an original opposed to the one end of the combined light-guides, through the block.

5 Claims, 6 Drawing Figures

READING OPTICAL SYSTEM

BACKGROUND OF THE INVENTION

1. Field of the Invention

This invention relates to a reading optical system which is used to read originals in a facsimile apparatus and which is easy to illuminate and durabile and easy to manufacture.

2. Description of the Prior Art

FIG. 1 of the accompanying drawings is a sideways cross-sectional view showing an example of the reading optical system according to the prior art. Reference numeral 1 designates a light-guide held by transparent blocks 2 and 3, reference numeral 4 denotes a light sensor, and reference numeral 6 designates the surface of an original. The light-guide 1 has been provided in contact with the origin P of the inclined bottom surface of the block 3, and the original 6 near the P-point has been read by the light sensor 4 through the light-guide. Also, the illuminating light has been caused to enter from between the original 6 and the inclined bottom surface of the block 3.

Such a conventional reading optical system has suffered from a disadvantage that the lower end of the light-guide 1 is liable to be abraded or injured by the contact thereof with the surface 6 of the original. However, if an attempt is made to install the light-guide 1 in spaced apart relationship with the P-point, the spacing between the end surface of the light-guide 1 and the surface 6 of the original becomes greater and this leads to the occurrence of a problem that the degree of resolution of the reading is reduced. Further, if an attempt is made to make the angle of the inclined surface with respect to the surface of the original smaller so that the end surface of the light-guide 1 is not very much spaced apart from the surface 6 of the original, the incidence range of the illuminating light becomes narrower, and this leads to an inconvenience that arrangement of a light source, etc. becomes difficult. Thus, it has heretofore been very difficult to obtain a reading optical system which will satisfy the requirements of protection of the light-guide, a high degree of resolution and ease of illumination at once.

SUMMARY OF THE INVENTION

It is an object of the present invention to provide a reading optical system of a high degree of resolution in which the possibility of the light-guide being damaged is reduced and which is easy to illuminate.

The present invention achieves the above object by a reading optical system which comprises a transparent block a part of whose bottom surface is an inclined surface forming an angle with respect to the horizontal plane, combined light-guides embedded in the block and having one end thereof all disposed on the intermediate portion of the inclined surface spaced apart by a predetermined distance from the terminal of the inclined surface and the other end extending on the upper surface of the block, a light sensor installed on the upper surface of the block in opposed relationship with the other end of the combined light-guides, and an illuminating system for illuminating the vicinity of the surface of an original opposed to the one end of the combined light-guides, through the block.

The invention will become more fully apparent from the following detailed description thereof taken in conjunction with the accompanying drawings.

DESCRIPTION OF THE PREFERRED EMBODIMENTS

Figure 2:
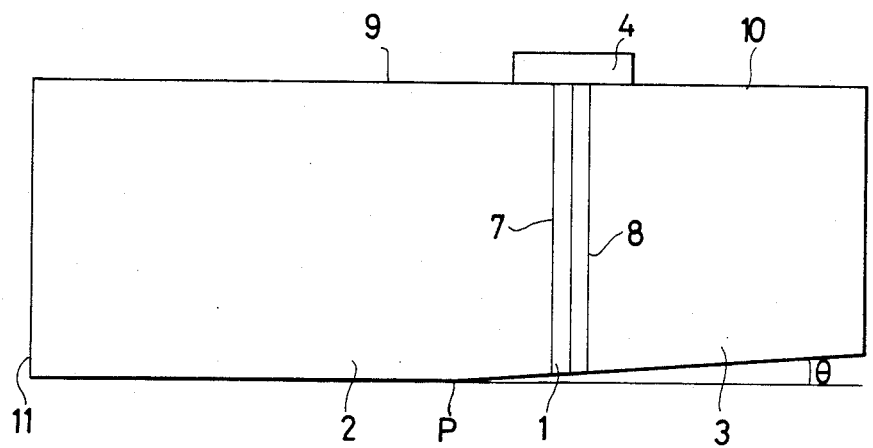
FIG. 2 is a sideways cross-sectional view showing the construction of a light-receiving system according to the present invention.

FIG. 2 is a sideways cross-sectional view showing the construction of a light-receiving system according to the present invention. In FIG. 2, reference numeral 1 designates a flux of light guides which may generally be optical fiber but may also be a convergent light transmitting member. Reference numerals 2 and 3 denote transparent blocks such as glass which hold the flux of light guides 1. Designated by 4 is a light sensor. The surfaces 7, 8 and 9 of the blocks 2 and 3 are subjected to the light non-transmitting treatment. The blocks are long ones extending in a direction perpendicular to the plane of the drawing sheet and correspondingly thereto, the flux of light guides 1 and the light sensor 4 are long ones extending in the form of an array in a direction perpendicular to the plane of the drawing sheet. The bottom surface of the blocks is an inclined surface forming an angle $\theta$ with respect to the horizontal plane from a region P, and the ends of the flux of light guides 1 are all disposed on the intermediate portion of the inclined surface spaced apart by a predetermined distance from the region P. The angle $\theta$ is set so that the surface 6 of an original and the ends of the flux of light guides 1 are not spaced so far apart from each other to reduce the degree of resolution of the reading.

Figure 1:
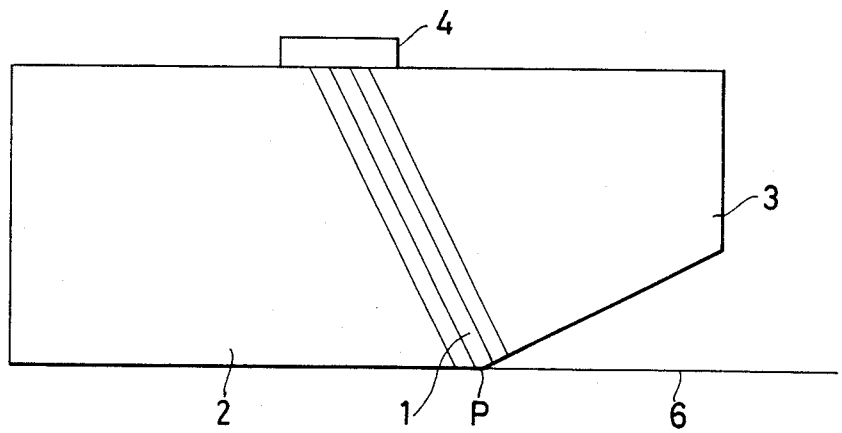
FIG. 1 is a sideways cross-sectional view showing an example of the reading optical system according to the prior art.
Figure 3:
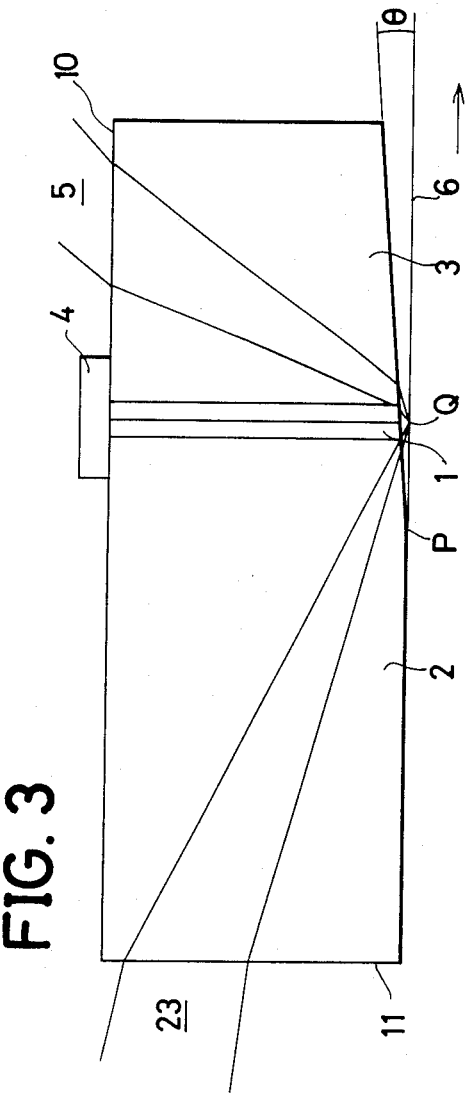
FIG. 3 is a sideways cross-sectional view showing the illuminating method in the present invention.

FIG. 3 shows the condition when an original is read in a facsimile apparatus or the like by the light-receiving system shown in FIG. 1. The block 2 is in contact with the surface 6 of the original moved relative thereto in the direction of the arrow at the bottom surface thereof, and the lower end of the flux of light guides 1 is positioned a little above the surface 6 of the original due to said angle $\theta$. The illuminating light 5 to the original enters from one surface 10 of the glass block 3 and illuminates the vicinity of a point Q on the surface 6 of the original near the lower end of the flux of light guides 1. Also, the illuminating light 23 enters from the surface 11 of the glass block 2 and illuminates the vicinity of the point Q. The reflected light from the point Q is projected onto the light sensor 4 by the flux of light guides 1. Accordingly, with the movement of the original 6 in the direction of arrow, each point along the original is read in succession.

As described above, the bottom surface of the optical system is an inclined surface forming an angle $\theta$ with respect to the horizontal plane from the region P, whereby a suitable clearance is formed just beneath the flux of light guides 1 to thereby prevent the contact between the original and the flux of light guides and thus, injury, abrasion and contamination of the end surface of the flux of light guides and adherence of dust thereto can be prevented.

Also, the surface 6 of the original is illuminated through the blocks 2 and 3 and therefore is efficiently illuminated independently of said angle θ. Also, the flux of light guides 1 has the direction of propagation of light thereof disposed perpendicularly to the surface of the original and therefore it is difficult for the regularly reflected component of the illuminating light to enter the flux of light guides and thus, reading at a high S/N ratio is possible.

If the light sensor 4 is designed to be able to cope with blue, green and red as by providing color filters on the end surface of the flux of light guides 1 or the light-receiving surface of the light sensor 4, it will of couse be possible to read colored originals.

Figure 4:
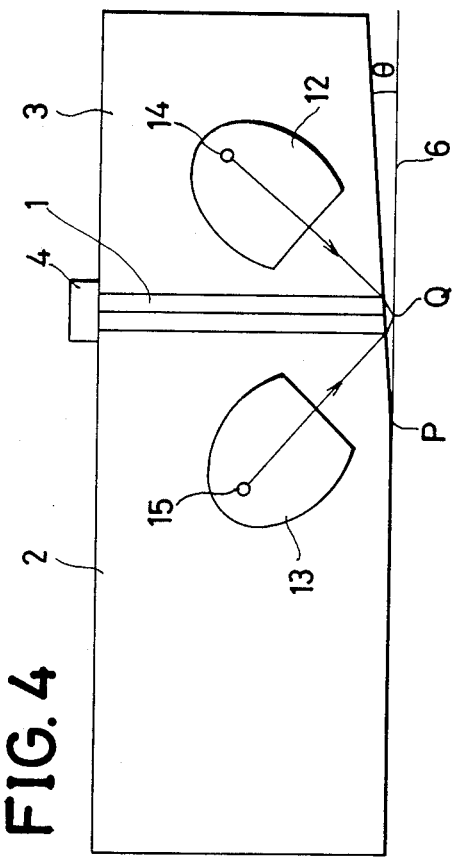
FIGS. 4 to 6 are sideways cross-sectional views showing embodiments of the reading optical system of the present invention.
Figure 5:
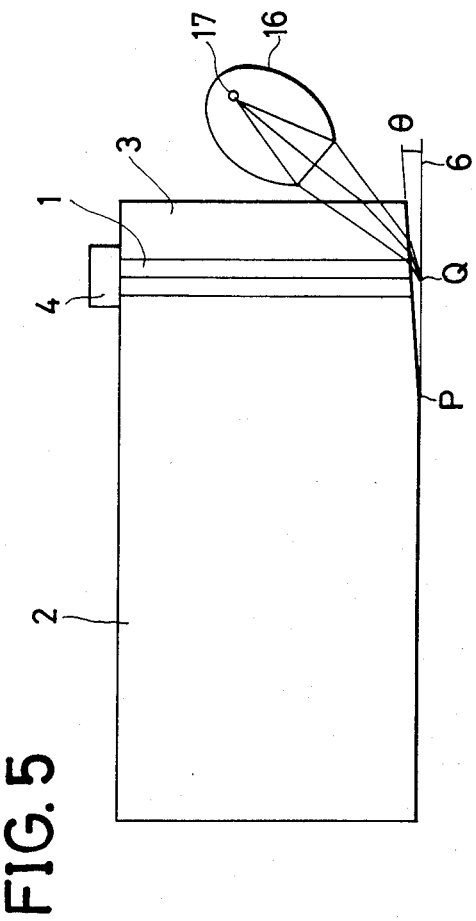
Figure 6:
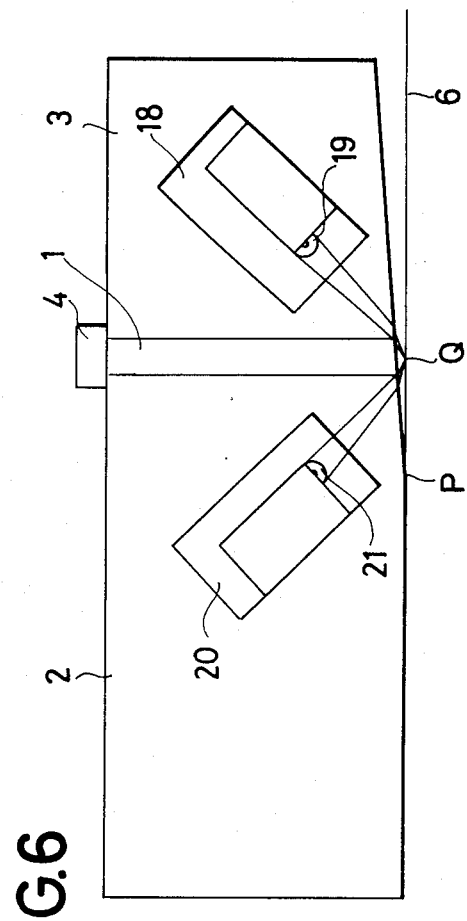

FIGS. 4 to 6 are sideways cross-sectional views showing additional embodiments of the reading optical system of the present invention. In these Figures, members common to those of FIG. 3 are given similar reference numerals.

In FIG. 4, reference numerals 12 and 13 designate space portions encircled by quadratic surfaces provided in the glass blocks 3 and 2. In this example, the cross-setion of each constitutes a part of an ellipse.

Reference numerals 14 and 15 denote light sources placed at the first focuses of the respective ellipses (the light sources each are formed, for example, by a semiconductor laser array or a light-emitting diode array). Said point Q is at the second focus of these ellipses. The inner surface of each of the space portions 12 and 13 is a reflecting surface and the light from each of the light sources 14 and 15 is reflected by this reflecting surface and condensed at the point Q.

Referring to FIG. 5, reference numeral 16 designates a pillar-like transparent block whose cross-section forms a part of an ellipse, and a light source 17 is disposed at the first focus of said ellipse. The second focus of the ellipse is coincident with the point Q, and the light emitted from the light source 17 is reflected by the boundary surface of the transparent block 16 and passes through the block 3 while being condensed, and illuminates the point Q.

Referring to FIG. 6, reference numerals 18 and 20 designate spaces formed in the blocks 3 and 2, respectively. In these spaces, illuminating devices 19 and 20 which emit convergent light beams are installed so as to illuminate the point Q.

The light sources in the above-described embodiments may be adapted for color reading by suitably arranging blue, green and red light sources.

What we claim is:

1. A reading optical system comprising:
    a transparent block having an upper surface and a bottom surface, a part of said bottom surface being an inclined surface forming an angle with respect to a horizontal plane;
    light-guide means embedded in said block, said light-guide means having one end disposed on an intermediate portion of said inclined surface spaced apart by a predetermined distance from a lower end of said inclined surface and the other end of said light-guide means being disposed on the upper surface of said block, and said angle of said inclined surface being small enough to make a distance between the surface of an original document and said one end of said light-guide means sufficiently small to maintain a predetermined degree of resolution of reading the surface of the original document;
    a light sensor installed on said upper surface of said block in opposed relationship with said other end of said light-guide means; and
    an illuminating system for illuminating the vicinity of the surface of the original document opposed to said one end of said light-guide means, through said block.

2. A reading optical system according to claim 1, wherein said illuminating system is installed in a space formed in said block.

3. A reading optical system according to claim 2, wherein said illuminating system comprises a space formed in said block, the cross-section of said space forming a part of an ellipse and the inner surface of said space being a reflecting surface, and a light source disposed at one focus of said ellipse.

4. A reading optical system according to claim 1, wherein said light-guide means has a direction of propagation of light thereof oriented perpendicularly to the surface of the original document.

5. A reading optical system according to claim 1, wherein said light-guide means comprises combined light guides.

* * * * *